US010102690B2

(12) United States Patent
Bell et al.

(10) Patent No.: US 10,102,690 B2
(45) Date of Patent: Oct. 16, 2018

(54) NON-STARTING ENGINE REMOTE DIAGNOSTIC

(71) Applicant: Deere & Company, Moline, IL (US)

(72) Inventors: Joseph A. Bell, Fairbank, IA (US); Curtis P. Ritter, Waterloo, IA (US); Ronald J. Marrah, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/413,844

(22) Filed: Jan. 24, 2017

(65) Prior Publication Data

US 2017/0256102 A1  Sep. 7, 2017

Related U.S. Application Data

(60) Provisional application No. 62/303,668, filed on Mar. 4, 2016.

(51) Int. Cl.
F02D 41/22 (2006.01)
G07C 5/00 (2006.01)
F02N 11/10 (2006.01)
G07C 5/08 (2006.01)
B60W 50/04 (2006.01)
H04L 29/08 (2006.01)
F02D 41/06 (2006.01)

(52) U.S. Cl.
CPC ............ G07C 5/008 (2013.01); B60W 50/045 (2013.01); F02D 41/22 (2013.01); F02N 11/10 (2013.01); F02N 11/108 (2013.01); G07C 5/08 (2013.01); G07C 5/0808 (2013.01); H04L 67/12 (2013.01); B60W 2050/046 (2013.01); F02D 41/062 (2013.01); F02N 2300/306 (2013.01)

(58) Field of Classification Search
CPC ........ G07C 5/008; G07C 5/08; G07C 5/0808; F02N 11/108; F02N 11/10; F02N 2300/306; H04I 67/12; B60W 50/045; B60W 2050/046; F02D 41/22; F02D 41/062
USPC .................... 123/179.3, 179.4; 701/107, 113
See application file for complete search history.

(56) References Cited

U.S. PATENT DOCUMENTS 9,702,315 B1* 7/2017 Palmer .................. F02D 43/00
2004/0002810 A1* 1/2004 Akuzawa ................ F02D 41/22
701/114
2006/0106509 A1* 5/2006 Robb ................. G05B 23/0216
701/29.1

(Continued)

FOREIGN PATENT DOCUMENTS

CN          204360213         5/2015

Primary Examiner — Hai Huynh
(74) Attorney, Agent, or Firm — Michael Best & Friedrich LLP

(57) ABSTRACT

An engine diagnostic system includes an engine and a control system having a controller operatively connected to the engine. A monitoring system has a measurement device operatively connected to the engine. A diagnostic system is operatively connected to the engine. A communication system is configured to send and receive data from a remote location. The diagnostic system is configured to implement a non-starting engine diagnostic procedure, at least a portion of which is performed while the engine is cranking, and to transmit data generated during the engine diagnostic procedure to the remote location through the communication system.

16 Claims, 3 Drawing Sheets

(56) References Cited

U.S. PATENT DOCUMENTS

| | | | |
|---|---|---|---|
| 2008/0059030 A1* | 3/2008 | Quigley | A62C 27/00 701/50 |
| 2008/0082228 A1 | 4/2008 | Massen et al. | |
| 2008/0228337 A1* | 9/2008 | Bauerle | F02D 11/107 701/31.6 |
| 2010/0089364 A1* | 4/2010 | Flanagan | F02B 25/04 123/435 |
| 2010/0175656 A1* | 7/2010 | Doub | F02N 11/10 123/179.3 |
| 2014/0007664 A1* | 1/2014 | Ito | F02D 41/1498 73/114.02 |
| 2016/0025027 A1* | 1/2016 | Mentele | F02D 41/22 701/102 |
| 2017/0211535 A1* | 7/2017 | Priem | F02B 63/04 |

* cited by examiner

NON-STARTING ENGINE REMOTE DIAGNOSTIC

RELATED APPLICATION(S)

This application is based on U.S. Provisional Application Ser. No. 62/303,668, filed Mar. 4, 2016, the disclosure of which is incorporated herein by reference in its entirety and to which priority is claimed.

FIELD

Various exemplary embodiments relate to performing remote engine diagnostic tests.

BACKGROUND

Modern engines are complex systems that can include numerous mechanical and electrical components. Due to these complex systems, complex monitoring and diagnostic testing are often required to detect and diagnose failures or errors in the engine. Certain engines are equipped with internal diagnostic systems. Internal systems however, may be limited in scope due to size, cost, or performance considerations associated with the engine. Technicians and service centers are often equipped with significantly more robust and sophisticated diagnostic capabilities. The size and remote location use of some machines or vehicles can make it impractical to bring to a service center and the complexity of the systems can result in a technician that travels to the location of the machine having to spend a significant amount of time diagnosing the system and carry a large number of replacement parts to the location.

Systems and methods of improving the diagnosis and service of the engine (and entire machines) can reduce the amount of time it takes a technician to resolve an issue, and improve machine uptime and the customer experience. A common problem is that the engine will crank but not start. Due to the complexity of modern engines and the large number of potential causes that could prevent the engine from starting, a technician must utilize sophisticated tools and follow multiple steps to diagnose the problem.

SUMMARY

According to an exemplary embodiment, an engine diagnostic system includes an engine and a control system having a controller operatively connected to the engine. A monitoring system has a measurement device operatively connected to the engine. A diagnostic system is operatively connected to the engine. A communication system is configured to send and receive data from a remote location. The diagnostic system is configured to implement a non-starting engine diagnostic procedure, at least a portion of which is performed while the engine is cranking, and to transmit data generated during the engine diagnostic procedure to the remote location through the communication system.

Another exemplary embodiment is directed to a method of diagnosing a non-starting engine. A signal is sent to a diagnostic system operatively connected to an engine, the signal is sent through a communication system configured to send and receive data from a remote location. A non-starting engine diagnostic procedure is implemented in response to the signal, wherein at least a portion of the non-starting engine diagnostic procedure is performed while the engine is cranking. Data generated during the non-starting engine diagnostic procedure related to the non-starting engine is obtained and transmitted to the remote location through the communication system.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
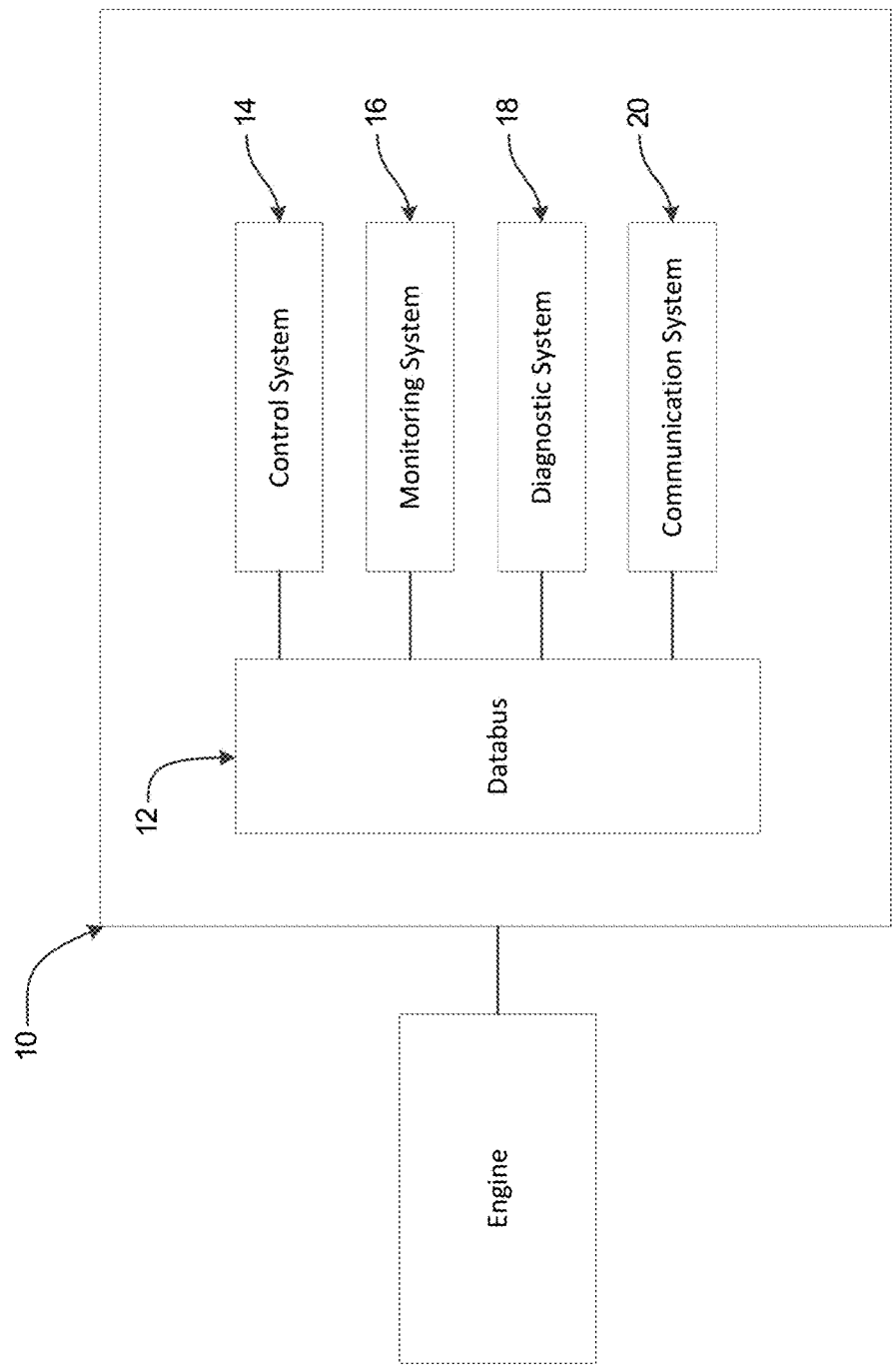
FIG. 1 is a schematic of an exemplary engine electronics system.

FIG. 1 shows an exemplary embodiment of an electronic processing system 10 that is connected to an engine. The engine can be part of a vehicle that contains one or more ground engaging members, for example tires or treads, that are powered by the engine. Alternative embodiments can be directed to other types of moving or stationary machines that utilize an engine, for example a diesel engine used in a generator.

In the exemplary embodiment shown in FIG. 1, the electronic processing system 10 includes a data bus 12 in communication with various components including a control system 14, a monitoring system 16, a diagnostic system 18, and a communication system 20. The electronic system 10 is configured to diagnose or at least partially diagnose different error conditions in the engine, for example a non-starting condition of the engine. Modern engines require sophisticated tools for diagnostics and service. There are many steps a technician must follow to diagnose an engine problem such as visual inspection, gathering data, or installing diagnostic tools. According to an exemplary embodiment, the diagnostic system 18 is connected to or integrated with the electronic system 10 to perform interactive tests and calibrations, such as a harness diagnostic test or injector calibration string input. By retrieving information and performing interactive tests locally and transmitting the data remotely, unnecessary diagnostic procedures can be eliminated or minimalized, allowing a technician to arrive at the machine with the right parts or a reduced range of parts.

The electronic processing system 10 can include one or more of a data processor and data storage component. The electronic processing system 10 can be implemented by a general purpose computer that is programmed with software modules. The data bus 12 provides communication between the different components. The control system 14 can include one or more controllers or electronic control units, for example an engine control unit. The control system 14 can include software and/or firmware stored in memory to perform different operations and tasks.

The monitoring system 16 can include various sensors or other measurement devices used to monitor the status of components in the engine. For example, the monitoring system can collect voltage information associated with different sensors, and this information can be compared to stored values in a chart or table. Based on discrepancies between the actual and stored values, error codes or diagnostic trouble codes (DTCs) can be generated, either by the control system 14 or the diagnostic system 18.

The diagnostic system 18 can be configured to perform multiple tasks, including initiating tests and recording errors sensed by the monitoring system 16. For example, the diagnostic system 18 can receive and record, for example through a software module or instructions for analyzing, the results of diagnostic tests, fault codes, error messages, status messages, or test results provided by the monitoring system 16. The diagnostic system 18 can also be capable of analyzing or comparing the information provided by the monitoring system 16 to a database that contains prior information related to the engine and standard operating information. The diagnostic system 18 can record and store data associated with the engine, and transfer that data via the communication system 20 over a network to a remote location, for example a dealer or service center.

The service center receives the transmitted data and then process the data to provide a recommendation to a technician. The data can be processed by one or more data processing systems that can include a server, central processing unit, software modules or programmable logic, and electronic memory. In certain instances, the recommendation identifies a reduced number of potential sources of the problem from the maximum potential sources to allow the technician to carry fewer parts or equipment when visiting a location. The diagnostic system 18 also may be capable of producing, storing, or communicating DTCs.

The communication system 20 is configured to locally and remotely communicate information over a communication network. The communication system 20 can provide communication over different wired or wireless systems and networks including mobile, satellite, Wi-Fi, near-field, Bluetooth, or a combination thereof as needed. In an exemplary embodiment, the communication system 20 is a telematics system. The telematics system includes, for example, a network of regional, national, or global hardware and software components. In addition, the telematics service may be provided by a private enterprise, such as an independent third-party company that provides the service to other companies, a manufacturing company that provides the service to its customers, or a company that provides the service to its own fleet of vehicles. Alternatively, the telematics service may be provided by a governmental agency as a public service. JDLink™ is an example of an agricultural vehicle telematics service, which is available from John Deere & Company.

The electronic processing system 10 can utilize other components including processors, data storage, data ports, user interface systems, controller area network buses, timers, etc., as would be understood by one of ordinary skill in the art.

Figure 2:
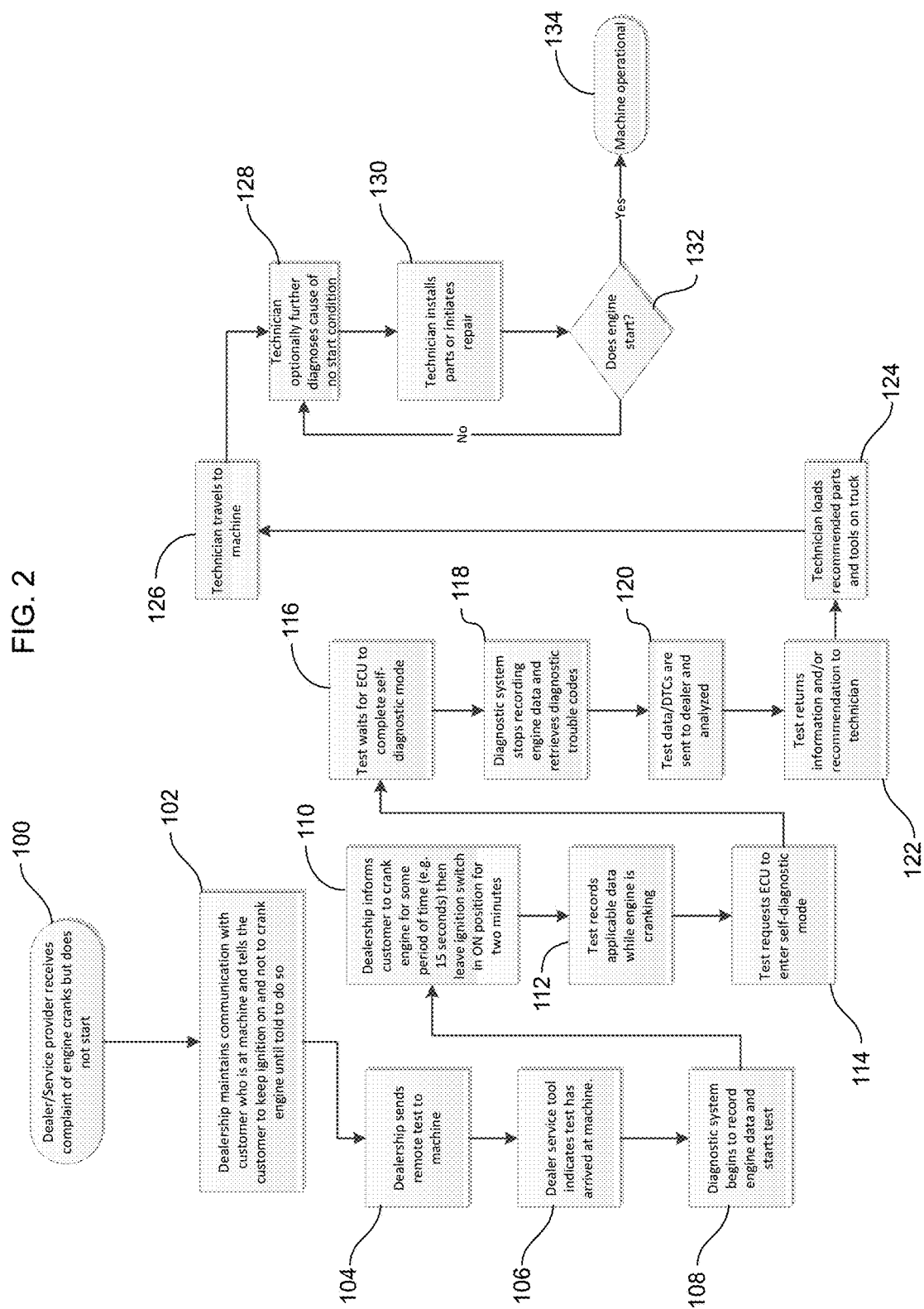
FIG. 2 is a flowchart illustrating an exemplary method of diagnosing a non-starting engine.

According to an exemplary embodiment, the electronics system 10 is configured to perform a diagnostic based on a non-starting engine and transfer generated information to a remote location. As shown in FIG. 2, a dealer or service center receives a complaint of a non-starting engine (100). The complaint can be from a customer call or generated automatically by the engine. An example of automatic generation can include the monitoring system 16 detecting multiple attempts to start the engine in a certain time period without a successful engine start and/or detecting a prolonged time period of engine cranking. If the complaint is received automatically, the service center can contact a user to ensure that the user is with the machine and in a safe place to perform the additional steps.

The service center then informs the customer to keep the ignition on but the engine off (102). A command is then sent remotely from the service center to the machine (104), for example utilizing a remote service tool, and a signal can be returned to indicate the request was received (106). The diagnostic system 18 then begins to record engine data and start the test (108). The service center informs the customer to crank the engine for a specified period of time, for example fifteen seconds, and then to leave the switch in the 'on' position (110). While the engine is cranking, one or more test are performed by the system 10, for example the control system 14 and/or diagnostic system 18, and applicable data is recorded (112). The tests can also place one or more of the engine control units into a self-diagnostic mode (114). Once all the tests are complete (116), the diagnostic system can stop recording data and retrieve one or more DTCs (118).

The test data and/or DTCs are then sent to the service center through the communication system 20 and analyzed by the service center (120). The gathered information is used to diagnose or narrow the problem for the technician (122), who can load the necessary parts (124) and travel to the machine (126). Once at the machine, the technician can perform further analyses and tests as needed (128). The technician can then install one or more replacement parts or perform a tasks to repair the engine (130) until the engine starts (132) and it is determined that the machine is operational (134).

Figure 3:
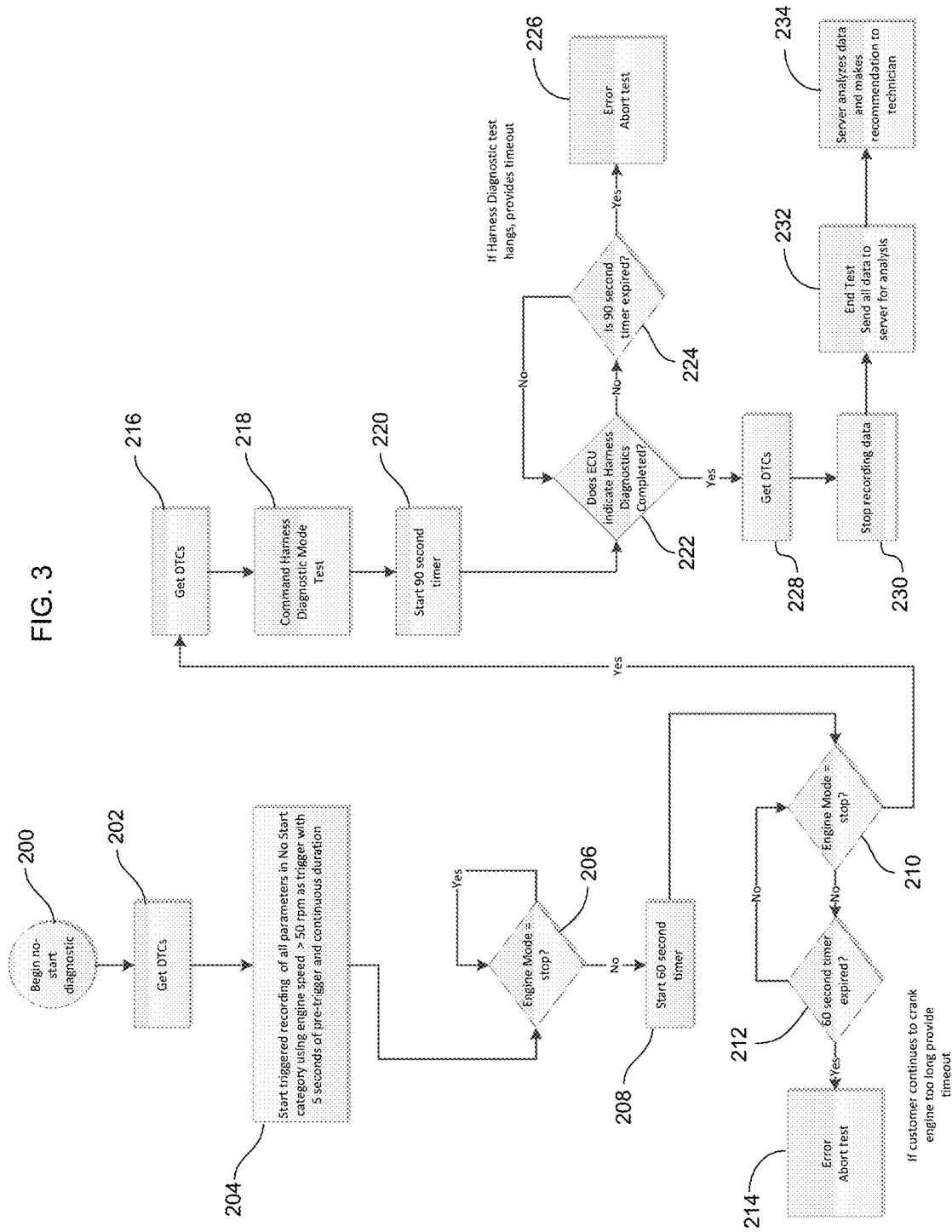
FIG. 3 is a flowchart illustrating an exemplary diagnostic procedure for a non-starting engine.

FIG. 3 shows an exemplary embodiment of a test diagnostic procedure that can be run by the diagnostic system 18. After a signal is received to begin the no-start diagnostic (200), a first check is performed to determine if there are any presently generated DTCs (202). If there are any DTCs, they can be recorded and stored or sent to the service center. After the diagnostic system 18 checks for DTCs, any present DTCs can be cleared.

The diagnostic system 18 then begins recording all parameters in a no-start engine category (204). In an exemplary embodiment the recording is triggered by a detection of a minimum engine speed, for example 50 revolutions per minute, with a 5 second pre-trigger continuous duration. This category will include different features and components based on the type of engine and fuel system and can be, or be related to, components of the engine identified as commonly resulting in a non-starting condition. The system then determines if the engine is stopped (206), and waits for the engine to be started by a user. At this time, the user begins to crank the engine for a time specified by the service center.

While the engine is cranking, a timer starts and runs for a predetermined time period (208), for example a 60 second timer, although other time periods can be used. The procedure then monitors if the engine stops (210). If the engine is not stopped after the predetermined time period (212), an error can be issued and the test can be canceled or restarted (214). If the engine is stopped within the predetermined time period the diagnostic system 18 retrieves any DTCs that were generated (216). If there are any DTCs, they can be recorded and stored or sent to the service center. After the diagnostic system 18 checks for DTCs, any present DTCs can be cleared.

The diagnostic system 18 can then, if necessary, institute a self-diagnostic command to one or more controllers. For example a harness diagnostic mode test can be implemented (218). In an exemplary embodiment, a harness diagnostic test includes a self-test that is programmed into the software of one or more controllers to assist in diagnosing electrical or mechanical engine problems that could cause a no-start situation. The functionality of the test varies depending on the engine, fuel system, and features. Some of the actions that can be performed include: Electrically energize the fuel injectors several times while the ECU monitors the injector current waveform and detect failures such as open or shorted circuits that result in a DTC; energize a high pressure fuel pump control solenoid(s) while the ECU monitors the current and detect failures such as open or shorted circuits resulting in a DTC; energize the engine cold start aid (e.g., glow plugs) briefly and verify that voltage is being applied to the device where a DTC would be expected if a failure is detected; command a learn (zero and span) of air system actuators (e.g., intake air throttle and exhaust gas recirculation) where an actuator that is not responding correctly to the learn command should result in a DTC; and test resistance of engine position sensor circuits (e.g., camshaft and crankshaft position) where a circuit that is out of range should result in a DTC. The harness diagnostic test can be run for a set period of time, for example 90 seconds, and be monitored by a timer (220). The controller monitors the harness diagnostic test (222), and if the harness diagnostic is not completed within the predetermined time (224), an error can be generated (226).

After the harness diagnostic is completed, the diagnostic system can retrieve any generated DTCs (228) and stop recording data (230). The DTCs and other recorded data are then sent to the service center for analysis (232). The service center analyzes the data and makes a recommendation to a technician (234).

Accordingly, the above identified systems and procedures can be used to remotely diagnose or eliminate potential problems with a non-starting engine condition.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An engine diagnostic system comprising:
    an engine and a control system having a controller operatively connected to the engine;
    a monitoring system having a measurement device operatively connected to the engine;
    a diagnostic system operatively connected to the engine; and
    a communication system configured to send and receive data from a remote location,
    wherein the diagnostic system is configured to implement a non-starting engine diagnostic procedure, at least a portion of which is performed while the engine is cranking, and to transmit data generated during the engine diagnostic procedure to the remote location through the communication system,
    wherein the communication system is configured to transmit data to a data processing system and the data processing system is configured to analyze the data and provide a recommendation based on the analyzed data, and
    wherein the recommendation identifies a reduced number of potential sources of a problem from a maximum amount of potential sources.

2. The engine diagnostic system of claim 1, wherein the diagnostic system is configured to implement a harness diagnostic test.

3. The engine diagnostic system of claim 2, wherein the data includes diagnostic trouble codes.

4. The engine diagnostic system of claim 1, wherein the non-starting engine diagnostic procedure monitors and records information from engine components in a non-starting engine category.

5. The engine diagnostic system of claim 1, wherein the diagnostic system is configured to record data after the engine begins cranking.

6. The engine diagnostic system of claim 1, wherein the remote location includes a communication module configured to send a signal to initiate the non-starting engine diagnostic procedure.

7. The engine diagnostic system of claim 1, wherein the engine is connected to a vehicle and operatively connected to one or more ground engaging elements.

8. The engine diagnostic system of claim 1, wherein the communication system includes a telematics system.

9. A method of diagnosing a non-starting engine comprising:
    sending a signal to a diagnostic system operatively connected to an engine, the signal sent through a communication system configured to send and receive data from a remote location;
    implementing a non-starting engine diagnostic procedure in response to the signal, wherein at least a portion of the non-starting engine diagnostic procedure is performed while the engine is cranking;
    obtaining data generated during the non-starting engine diagnostic procedure related to the non-starting engine;
    transmitting the data to the remote location through the communication system; and
    receiving the data at the remote location and analyzing by a data processing system, wherein the data processing system is configured to analyze the data and provide a recommendation based on the analyzed data, and wherein the recommendation identifies a reduced number of potential sources of a problem from a maximum amount of potential sources.

10. The method of claim 9, wherein the diagnostic system is configured to record one or more engine parameters during the non-starting engine diagnostic procedure.

11. The method of claim 9, further comprising a user cranking the engine during the non-starting engine diagnostic procedure for a set period of time.

12. The method of claim 11, further comprising issuing an error if the engine is being cranked after the set period of time.

13. The method of claim 11, further comprising performing a harness diagnostic test during the non-starting engine diagnostic procedure when the engine is not being cranked.

14. The method of claim 9, wherein the data includes diagnostic trouble codes.

15. The method of claim 9, further comprising presenting the recommendation to a technician.

16. The method of claim 9, wherein the signal is sent from the remote location.

\* \* \* \* \*